US009779701B2

United States Patent
Matsuoka

(10) Patent No.: US 9,779,701 B2
(45) Date of Patent: Oct. 3, 2017

(54) IMAGE PROCESSING APPARATUS, IMAGE PROCESSING METHOD, AND IMAGING APPARATUS

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 14/612,811

(22) Filed: Feb. 3, 2015

(65) Prior Publication Data
US 2015/0221072 A1 Aug. 6, 2015

(30) Foreign Application Priority Data

Feb. 5, 2014 (JP) ................................. 2014-020480

(51) Int. Cl.
*G06K 9/40* (2006.01)
*G09G 5/377* (2006.01)
*G06T 5/00* (2006.01)
*G06T 5/20* (2006.01)

(52) U.S. Cl.
CPC ............. *G09G 5/377* (2013.01); *G06T 5/002* (2013.01); *G06T 5/20* (2013.01)

(58) Field of Classification Search
CPC G06T 5/10; G06T 5/001; G06T 5/002; G06T 5/003; G06T 5/20; G06T 5/50; G09G 5/377; H04N 5/21
See application file for complete search history.

(56) References Cited

U.S. PATENT DOCUMENTS

| 5,737,450 A * | 4/1998 | Hajjahmad | G06T 5/20 375/240.2 |
| 6,577,312 B2 * | 6/2003 | Deering | G06T 5/002 345/428 |
| 7,110,455 B2 * | 9/2006 | Wu | G06T 5/002 348/699 |
| 8,005,310 B2 * | 8/2011 | Frei | G06T 5/003 358/3.26 |

(Continued)

FOREIGN PATENT DOCUMENTS

JP 2004-102904 A 4/2004

*Primary Examiner* — Amir Alavi
(74) *Attorney, Agent, or Firm* — Canon USA, Inc. I.P. Division

(57) ABSTRACT

There is provided at least one image processing apparatus capable of precisely reproducing a large blur similar to a background blur produced by a single-lens reflex camera, while suppressing a circuit scale for filter processing. A two-dimensional filter processing circuit of at least one embodiment of an image processing unit performs the filter processing using first to N-th division filters each having a plurality of filter coefficients (where N is an integer of 2 or more) on an input image to generate first to N-th intermediate images. A combination unit of the at least one embodiment of the image processing unit combines or adds together the first to N-th intermediate images generated by the two-dimensional filter processing circuit to generate an integrated image. Thus, a large blur similar to a background blur produced by the single-lens reflex camera can be precisely reproduced by small-size two-dimensional filter processing.

10 Claims, 6 Drawing Sheets

(56) References Cited

U.S. PATENT DOCUMENTS

| | | | | |
|---|---|---|---|---|
| 8,391,628 B2* | 3/2013 | Huang | .................... | G06T 5/002 345/611 |
| 9,002,131 B2* | 4/2015 | Rao | ........................ | G06T 5/002 382/218 |
| 2013/0107944 A1* | 5/2013 | Watanabe | .......... | H04N 19/0009 375/240.03 |
| 2015/0221072 A1* | 8/2015 | Matsuoka | .............. | G09G 5/377 382/260 |
| 2016/0035067 A1* | 2/2016 | Takagi | ...................... | G06T 5/20 382/260 |
| 2016/0037062 A1* | 2/2016 | Sasaki | .................... | H04N 5/772 348/241 |

\* cited by examiner

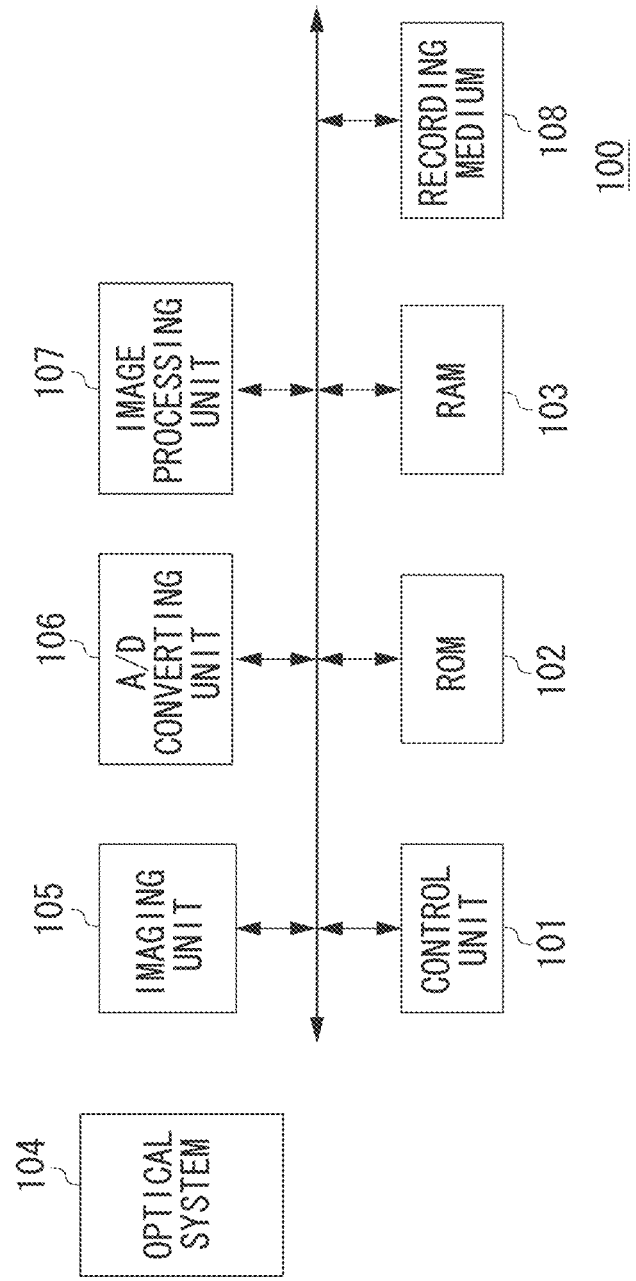

IMAGE PROCESSING APPARATUS, IMAGE PROCESSING METHOD, AND IMAGING APPARATUS

BACKGROUND OF THE INVENTION

Field of the Invention

The present inventions relate to at least one image processing apparatus, at least one image processing method, and at least one imaging apparatus that provide a blurring processing function.

Description of the Related Art

When capturing an image, a compact digital camera focuses on a relatively wider distance range than a single-lens reflex camera. Therefore, the compact digital camera cannot capture an image having a largely blurred background, which can be performed by the single-lens reflex camera. For this reason, digital filter processing has been conventionally performed by the compact digital camera, to obtain a large blurring effect. In the digital filter processing, a blur equivalent to a blur obtained by the single-lens reflex camera is applied to a captured image. For example, Japanese Patent Application Laid-Open No. 2004-102904 discusses a technique for providing an image with a large blur by performing small-size filter processing. In this technique, the small-size filter processing is performed on a reduced image, and the reduced image is then enlarged to an original size.

However, the conventional technique discussed in Japanese Patent Application Laid-Open No. 2004-102904 cannot precisely reproduce a blur similar to a background blur produced by the single-lens reflex camera, due to a small filter size. For example, there is an image-capturing method for forming a large round blur on a point light source in a background, when using a single-lens reflex camera. However, details of the shape of the round blur cannot be sufficiently expressed by performing the small-size filter processing discussed in Japanese Patent Application Laid-Open No. 2004-102904, because a high-frequency component of the image is lost by the reduction of the image. If the filter processing without reducing an image is performed to reproduce a large blur similar to a background blur produced by the single-lens reflex camera, a multiple-tap two-dimensional filter of about 50 taps is required. When this filter is implemented on a circuit, a circuit scale becomes considerably large.

The present inventions are directed to at least one image processing apparatus, at least one image processing method and at least one imaging apparatus capable of precisely reproducing a large blur similar to a background blur produced by a single-lens reflex camera, while suppressing a circuit scale of the filter processing.

SUMMARY OF THE INVENTION

According to one or more aspects of the present inventions, at least one image processing apparatus includes a filter processing unit configured to perform filter processing using first to N-th division filters each having a plurality of filter coefficients (where N is an integer of 2 or more) on a first image to generate first to N-th intermediate images, and a combination unit configured to combine or add together the first to N-th images generated by the filter processing unit to generate a second image. According to other aspects of the present inventions, other image processing apparatuses, image processing methods and imaging apparatuses are discussed herein.

Further features of the present inventions will become apparent from the following description of exemplary embodiments with reference to the attached drawings.

BRIEF DESCRIPTION OF THE DRAWINGS

FIG. 1 is a block diagram illustrating a configuration example of an imaging apparatus according to an exemplary embodiment of the present inventions.

DESCRIPTION OF THE EMBODIMENTS

Figure 2A:
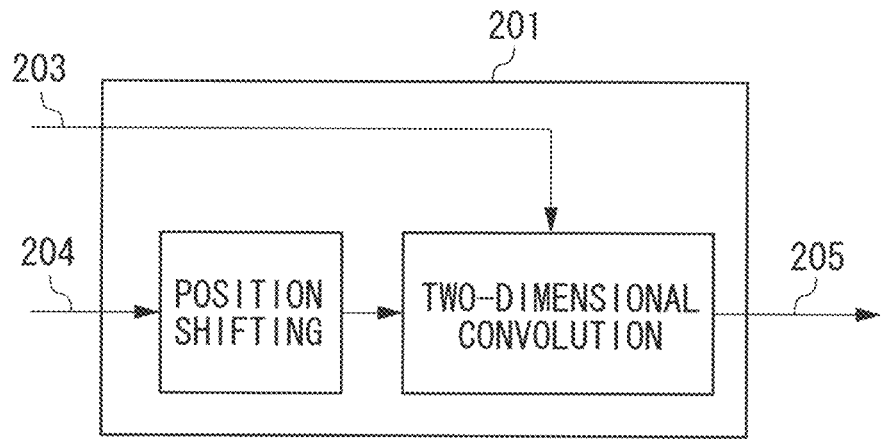
FIGS. 2A, 2B, and 2C are block diagrams illustrating a configuration example of an image processing unit according to a first exemplary embodiment.

Exemplary embodiments of the present inventions will be described below with reference to the drawings.

A first exemplary embodiment of the present inventions will be described. The present exemplary embodiment will be described about an example case where the present exemplary embodiment of the present inventions is applied to an imaging apparatus (digital camera) which is an example of an image processing apparatus.

FIG. 1 is a block diagram illustrating a configuration example of the imaging apparatus (digital camera) according to the present exemplary embodiment. A control unit 101 is, for example, a central processing unit (CPU). The control unit 101 reads out an operation program for each function unit included in a digital camera 100 from a read only memory (ROM) 102, loads the program onto a random access memory (RAM) 103, and executes the program to control operation of each function unit included in the digital camera 100.

The ROM 102 is a rewritable non-volatile memory. The ROM 102 stores, in addition to the operation program for each function unit included in the digital camera 100, parameters necessary for the operation of each function unit. The RAM 103 is a rewritable volatile memory, and is used as a temporary storage area for storing data output in the operation of each function unit included in the digital camera 100.

An optical system 104 includes a lens and a diaphragm, and forms an object image on an imaging unit 105. The imaging unit 105 photoelectrically converts an optical image formed on an image sensor by the optical system 104, and outputs an analog image signal obtained by the photoelectric conversion to an analog-to-digital (A/D) converting unit 106. The imaging unit 105 includes, for example, the image sensor such as a charge-coupled device (CCD) image sensor and a complementary metal oxide semiconductor (CMOS) image sensor. The A/D conversion unit 106 performs A/D conversion processing on the input analog image signal, and outputs digital image data obtained by the A/D conversion processing to the RAM 103 to store the received digital image data.

An image processing unit 107 performs image processing on the image data stored in the RAM 103. For example, the image processing unit 107 includes a two-dimensional filter processing circuit 201, an image addition circuit 206, and an image division circuit 210 illustrated in FIGS. 2A, 2B, and 2C, respectively, and provides a captured image with a desired blur by performing the image processing on image data. A recording medium 108 is a detachable memory card or the like. The recording medium 108 records, as recorded images, images such as an image stored in the RAM 103 after being processed by the image processing unit 107 and an image subjected to the A/D conversion processing by the A/D conversion unit 106.

A configuration and operation of the image processing unit 107 according to the present exemplary embodiment will be described below with reference to FIGS. 2A, 2B, and 2C to FIG. 4.

Figure 3:
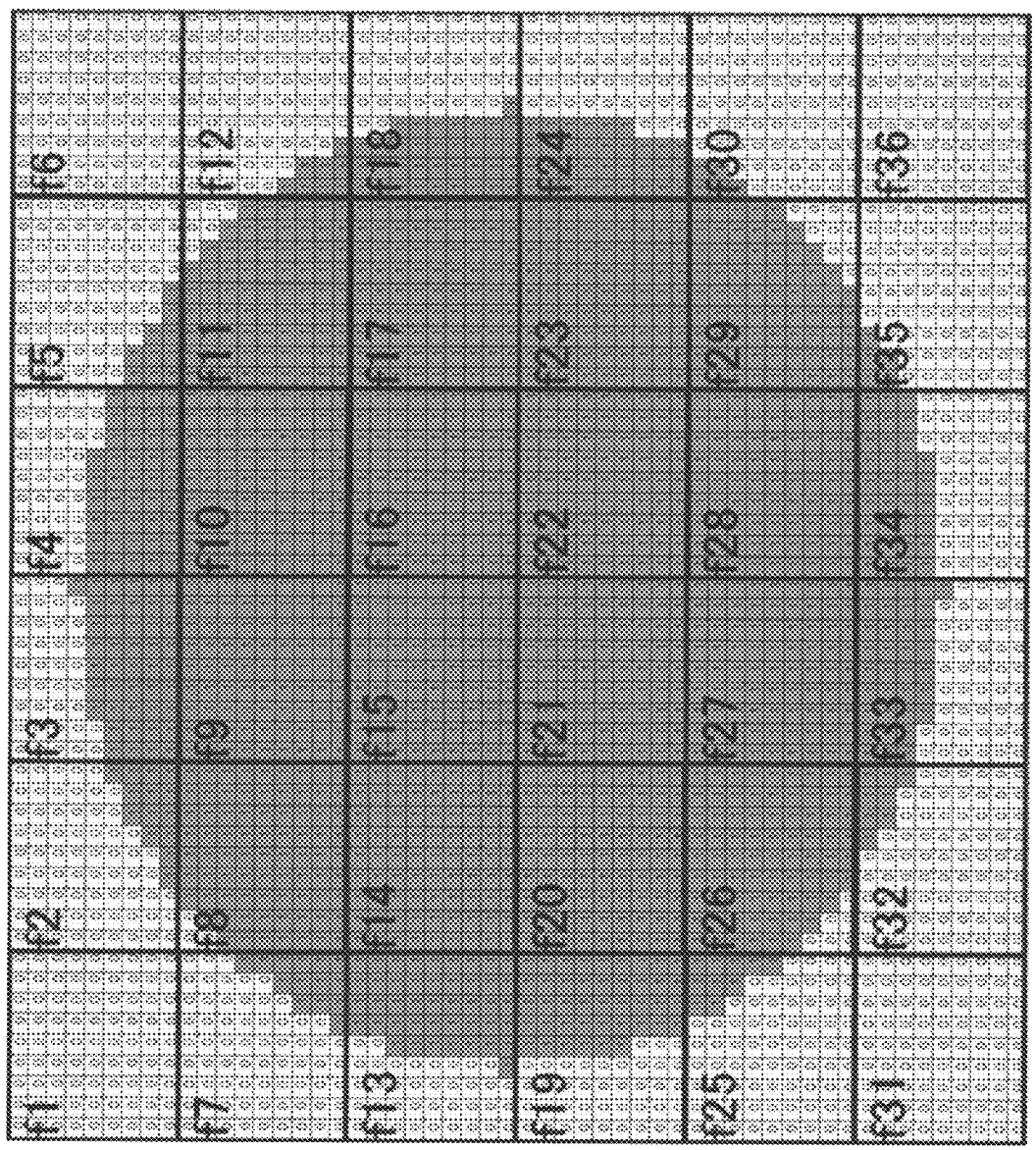
FIG. 3 is a diagram illustrating two-dimensional filter coefficients according to the first exemplary embodiment.

FIG. 3 is a diagram illustrating a filter having a plurality of filter coefficients used for two-dimensional filter processing to be applied to a captured image. As illustrated in FIG. 3, a filter shape is cylindrical, so that a blur similar to a round blur produced by a single-lens reflex camera can be expressed by applying this filter processing to a captured image. Further, as for a filter size, a cylindrical part has (47 taps)×(47 taps). Division filters f1, f2, . . . , f36 each having a size of (9 taps)×(9 taps) form two-dimensional filter coefficients. The division filters f1, f2, . . . , f36 are arranged in a matrix of 6 by 6 blocks, and can express two-dimensional filter coefficients of (54 taps)×(54 taps) at the maximum.

Figure 4:
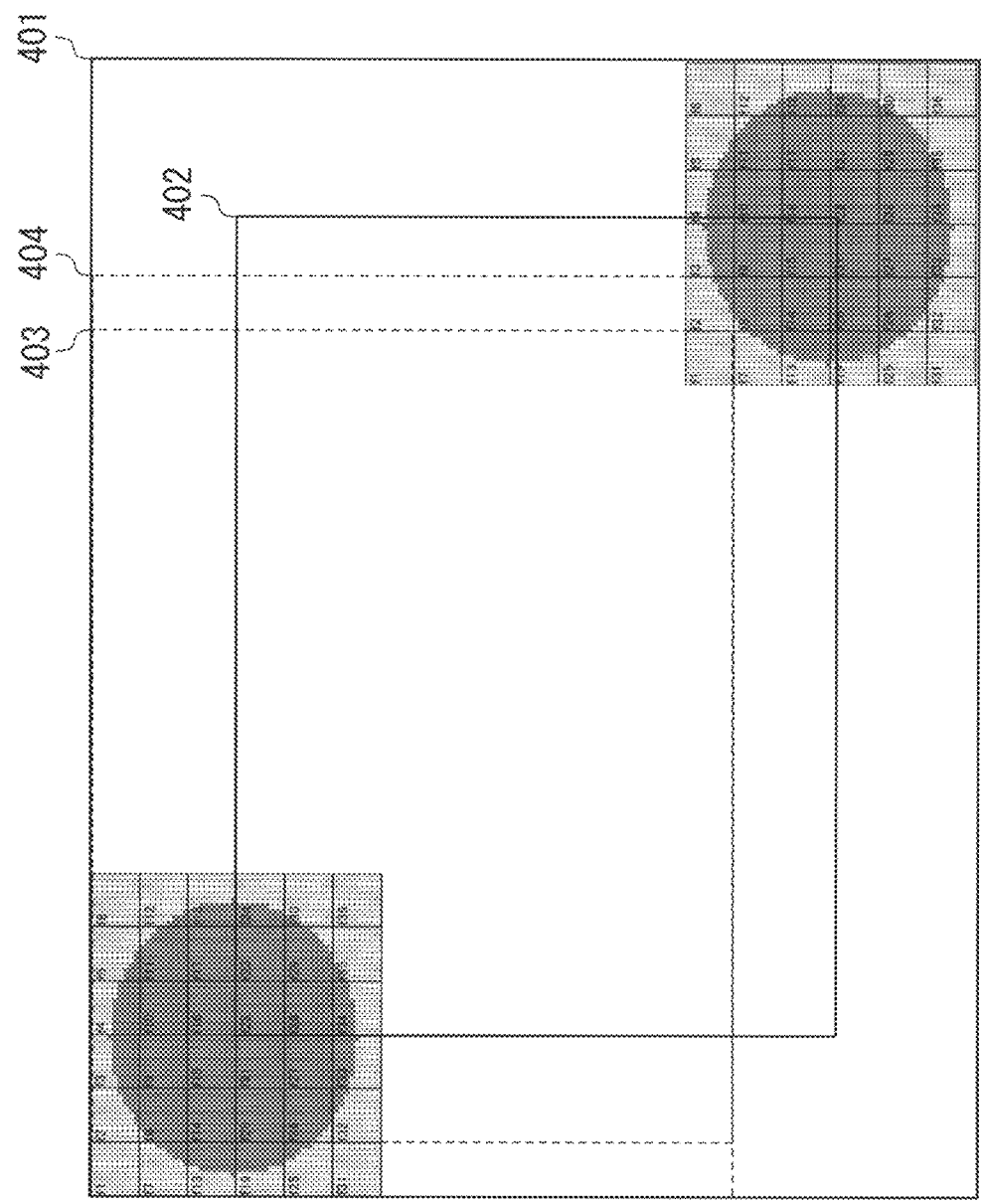
FIG. 4 is a diagram illustrating operation of the image processing unit according to the first exemplary embodiment.

FIG. 4 is a diagram illustrating how the two-dimensional filter processing illustrated in FIG. 3 is applied to a captured image. FIG. 4 illustrates an input image 401 that is a captured image serving as a first image. FIG. 4 also illustrates a region 402 of an output image serving as a second image obtained by performing the filter processing using the two-dimensional filter of (54 taps)×(54 taps).

Figure 2B:
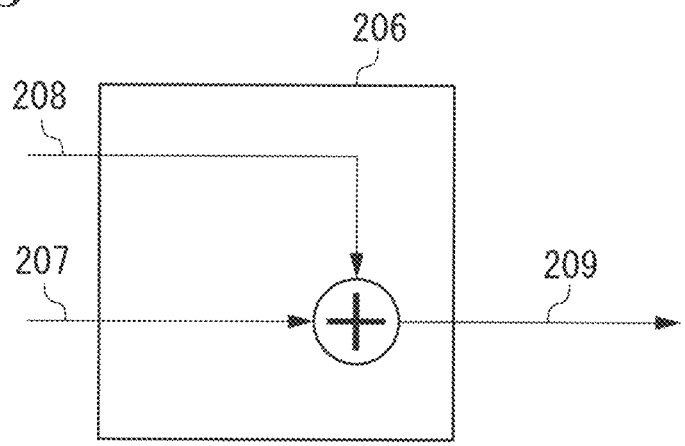
Figure 2C:
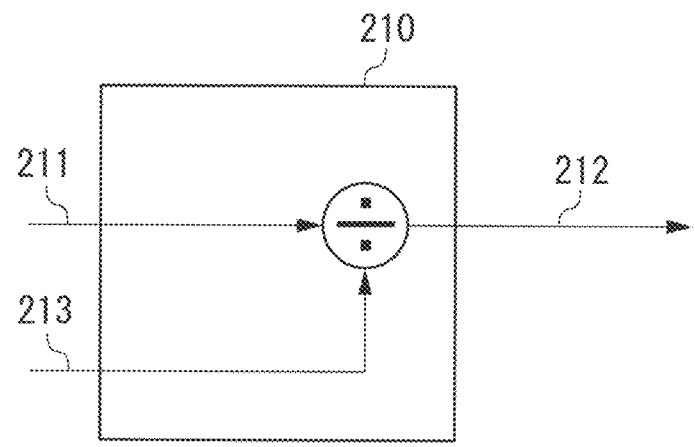

FIGS. 2A, 2B, and 2C are diagrams illustrating a configuration example of the image processing unit 107 according to the present exemplary embodiment. FIG. 2A illustrates the two-dimensional filter processing circuit 201 that performs two-dimensional filter processing of (9 taps)×(9 taps). FIG. 2A also illustrates a two-dimensional filter coefficient input signal 203, an image input signal 204, and a two-dimensional filter output signal 205. The two-dimensional filter processing circuit 201 reads out a desired region of the input image 401, to perform two-dimensional convolution processing.

When performing the two-dimensional filter processing using the filter coefficients illustrated in FIG. 3 on the input image 401, the two-dimensional filter processing circuit 201 applies the division filter f1 illustrated in FIG. 3 to the input image 401. In this process, the two-dimensional filter processing circuit 201 reads out a region 403 that is a part of the input image 401 illustrated in FIG. 4, and then performs the filter processing using the division filter f1 to generate a first intermediate image. Similarly, the two-dimensional filter processing circuit 201 reads out a region 404 that is a part of the input image 401 illustrated in FIG. 4, and then performs the filter processing using the division filter f2 illustrated in FIG. 3 to generate a second intermediate image.

FIG. 2B illustrates the image addition circuit 206. The image addition circuit 206 includes image inputs 207 and 208, as well as an image output 209. The image addition circuit 206 performs addition (combination) processing on images input from the image inputs 207 and 208, and outputs an image subjected to the addition processing from the image output 209. The image addition circuit 206 receives the first and second intermediate images generated as described above that are input from the image inputs 207 and 208. The image addition circuit 206 then generates a second integrated image by adding the received first and second intermediate images together, and outputs the generated second integrated image from the image output 209.

Next, in a manner similar to the processing using the division filter f2 illustrated in FIG. 3, the two-dimensional filter processing circuit 201 shifts a target image region from the current region of the input image 401 to the next region, and then performs the filter processing using the division filter f3 illustrated in FIG. 3 to generate a third intermediate image. The image addition circuit 206 generates a third integrated image by adding the second and third intermediate images together. For the division filters f4 to f36 illustrated in FIG. 3, the two-dimensional filter processing circuit 201 and the image addition circuit 206 perform similar processing, by shifting a target image region for each division filter, thereby eventually generating a thirty-sixth integrated image.

FIG. 2C illustrates the image division circuit 210. The image division circuit 210 includes an image input 211, a normalization coefficient input 213, and an image output 212. The image division circuit 210 divides the thirty-sixth integrated image input from the image input 211, by a value input from the normalization coefficient input 213, and outputs an image subjected to the division processing from the image output 212 as a final blurred image. Here, the sum of the coefficient values of the two-dimensional filter coefficients illustrated in FIG. 3 is 1653, and therefore, 1653 is input to the normalization coefficient input 213.

Here, in the present exemplary embodiment, the division filters f1 to f36 illustrated in FIG. 3, which are stored beforehand in the ROM 102, are loaded onto the RAM 103 and then input to the two-dimensional filter coefficient input 203 of the image processing unit 107. However, the present inventions are not limited to this configuration. For example, the control unit 101 may function as a filter coefficient dividing unit that generates the two-dimensional filter coefficients of (54 taps)×(54 taps) illustrated in FIG. 3 on the RAM 103, and divides the generated two-dimensional filter coefficient into 36, i.e., the division filters f1 to f36. In this case, the two-dimensional filter coefficient data stored in the ROM 102 illustrated in FIG. 1 can be reduced.

According to the present exemplary embodiment, a large blur similar to a blur obtained by the two-dimensional filter processing of 54 taps can be given to a captured image, by performing two-dimensional filter processing of a small size such as 9 taps, without impairing details. In other words, a large blur similar to a background blur produced by a single-lens reflex camera can be precisely reproduced, while a circuit scale of the filter processing is suppressed.

Next, a second exemplary embodiment of the present inventions will be described. A configuration of an imaging apparatus (digital camera) which is an example of an image processing apparatus according to the present exemplary embodiment is similar to the configuration of the imaging apparatus (digital camera) according to the first exemplary embodiment illustrated in FIG. 1.

Figure 5A:
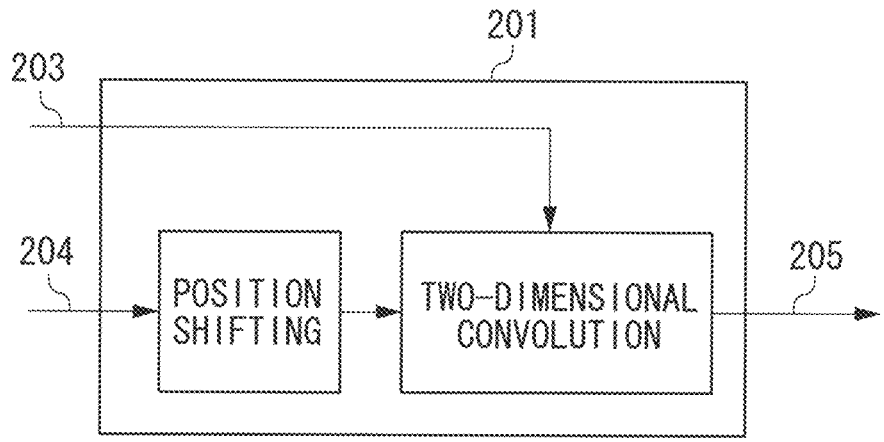
FIGS. 5A, 5B, and 5C are block diagrams illustrating a configuration example of an image processing unit according to a second exemplary embodiment.
Figure 5B:
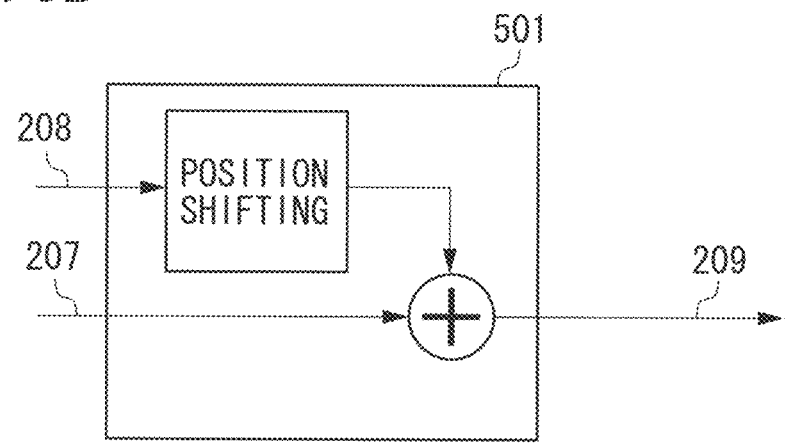
Figure 5C:
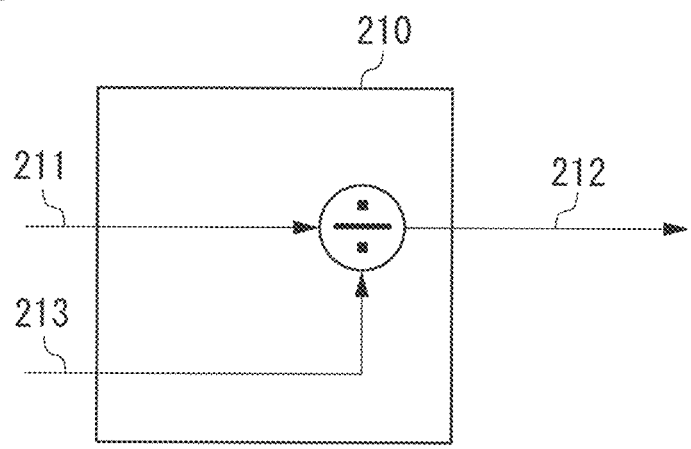

A configuration and operation of an image processing unit 107 according to the present exemplary embodiment will be described with reference to FIGS. 5A, 5B, 5C, and 6. FIGS. 5A, 5B, and 5C are diagrams illustrating a configuration example of the image processing unit 107 according to the present exemplary embodiment. In FIGS. 5A, 5B, and 5C, the same components as those illustrated in FIGS. 2A to 2C are provided with the same reference numerals as those used in FIGS. 2A to 2C, and overlapping description thereof will be omitted. In the configuration of the image processing unit 107 according to the present exemplary embodiment, a point different from the configuration of the image processing unit 107 according to the first exemplary embodiment is an image addition circuit 501. The image addition circuit 501 performs addition processing on images input from image inputs 207 and 208, and outputs an image subjected to the addition processing from an image output 209.

The operation of the image processing unit 107 according to the present exemplary embodiment is similar to that according to the first exemplary embodiment, except for processing by the division filter having filter coefficients of all "1" in the filter coefficients illustrated in FIG. 3. In other words, in the present exemplary embodiment, processing by the division filters f9, f10, f14, f15, f16, f17, f20, f21, f22, f23, f27, and f28 is different from the processing according to the first exemplary embodiment.

Figure 6:
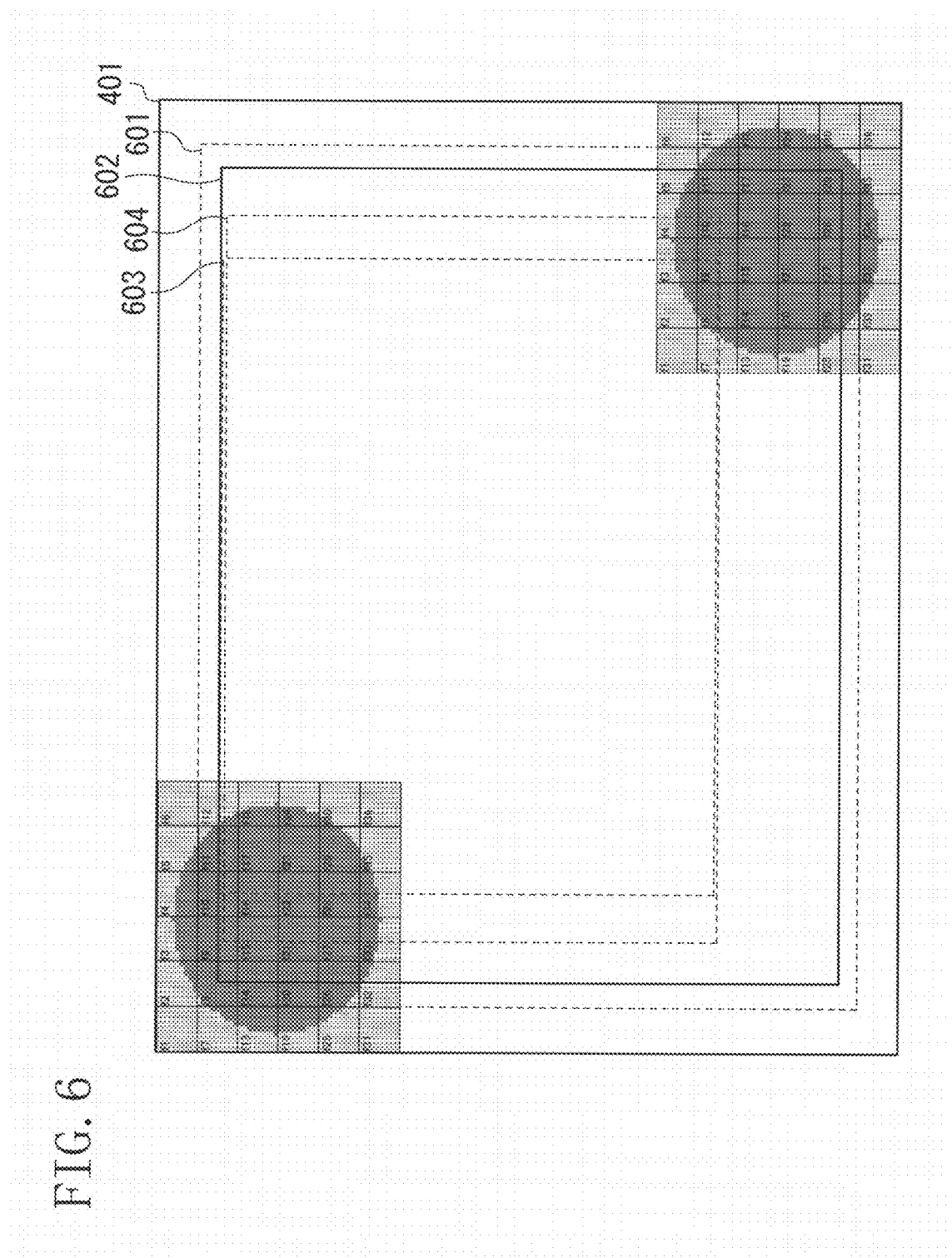
FIG. 6 is a diagram illustrating operation of the image processing unit according to the second exemplary embodiment.

When applying the division filter f9 illustrated in FIG. 3 to an input image, a two-dimensional filter processing circuit 201 illustrated in FIG. 5A reads out a region 601 that is a part of an input image 401 illustrated in FIG. 6, and performs the filter processing using the division filter f9 to generate a ninth intermediate image. FIG. 6 illustrates an output image region 602 of the ninth intermediate image. In the present exemplary embodiment, the filter processing is not performed by the division filters f10, f14, f15, f16, f17, f20, f21, f22, f23, f27, and f28 illustrated in FIG. 3.

When generating a ninth integrated image by adding an intermediate image to an eighth integrated image, the image addition circuit 501 illustrated in FIG. 5B reads out a region 603 (FIG. 6) that is a part of the ninth intermediate image, and adds this region 603 to the eighth integrated image, thereby generating the ninth integrated image. Further, when generating a tenth integrated image by adding an intermediate image to the ninth integrated image, the image addition circuit 501 reads out a region 604 (FIG. 6) that is a part of the ninth intermediate image, and adds this region 604 to the ninth integrated image, thereby generating the tenth integrated image. When generating each of fourteenth, fifteenth, sixteenth, seventeenth, twentieth, twenty-first, twenty-second, twenty-third, twenty-seventh, and twenty-eighth integrated images, the image addition circuit 501 performs similar processing while shifting a target image region. More specifically, the image addition circuit 501 reads out and adds a region that is a part of the ninth intermediate image while shifting a target image region of the ninth intermediate image, thereby generating each of these integrated images.

According to the present exemplary embodiment, by a division filter group having the same division filter coefficients among the division filters f1 to f36, the filter processing is performed only once based on a selected representative division filter. When generating the integrated image, the target image regions in the intermediate image generated by the filter processing using the representative division filter are shifted and read out respectively, and integrated (combined). Therefore, when there are division filters having the same division filter coefficients, image processing time can be reduced.

Next, a third exemplary embodiment of the present inventions will be described. A configuration of an imaging apparatus (digital camera) which is an example of an image processing apparatus according to the present exemplary embodiment is similar to the configuration of the imaging apparatus (digital camera) according to the first exemplary embodiment illustrated in FIG. 1.

Operation of an image processing unit 107 according to the present exemplary embodiment is similar to that according to the first exemplary embodiment, except for processing by the division filters having filter coefficients of all "0" (zero) in the filters illustrated in FIG. 3. In other words, in the present exemplary embodiment, processing by the division filters f1, f6, f31, and f36 is different from the processing according to the first exemplary embodiment.

In the present exemplary embodiment, the filter processing in a two-dimensional filter processing circuit is not performed by the division filters f1, f6, f31, and f36 each having coefficients of all "0" (zero), among the division filters illustrated in FIG. 3. Further, an image addition circuit does not perform the addition processing on first, sixth, thirty-first, and thirty-sixth integrated images.

According to the present exemplary embodiment, the division filters having filter coefficients of all zero are not used for the filter processing, and the filter processing and the addition processing are not performed by these division filters. Therefore, when the division filters having filter coefficients of all zero are present, image processing time can be reduced.

The second exemplary embodiment and the third exemplary embodiment described above may be combined and applied. The exemplary embodiments of the present inventions have been described above. However, the present inventions are not limited to these exemplary embodiments, and may be variously altered and modified within a scope of the gist of the present inventions.

Embodiments of the present inventions can also be realized by a computer of a system or apparatus that reads out and executes computer executable instructions recorded on a storage medium (e.g., non-transitory computer-readable storage medium) to perform the functions of one or more of the above-described embodiment(s) of the present inventions, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-020480, filed Feb. 5, 2014, which is hereby incorporated by reference herein in its entirety.

What is claimed is:
1. An image processing apparatus comprising:
at least one processor that operates to:

perform filter processing using first to N-th division filters each having a plurality of filter coefficients on a first image to generate first to N-th intermediate images, where N is an integer of 2 or more; and combine the generated first to N-th intermediate images to generate a second image, wherein the at least one processor changes a range to be subjected to the filter processing on the first image, for each of the division filters.

2. The image processing apparatus according to claim 1, wherein the at least one processor further operates to generate the first to N-th division filters each having the plurality of filter coefficients by dividing a filter having a plurality of filter coefficients.

3. The image processing apparatus according to claim 2, wherein, for any division filter(s) having same division filter coefficients among the first to N-th division filters, the at least one processor uses only a representative division filter selected from the division filters having the same division filter coefficients for the filter processing.

4. The image processing apparatus according to claim 2, wherein the at least one processor does not use a division filter having division filter coefficients of all zero among the first to N-th division filters for the filter processing.

5. The image processing apparatus according to claim 1, wherein, for any division filter(s) having same division filter coefficients among the first to N-th division filters, the at least one processor uses only a representative division filter selected from the division filters having the same division filter coefficients for the filter processing.

6. The image processing apparatus according to claim 1, wherein the at least one processor does not use a division filter having division filter coefficients of all zero among the first to N-th division filters for the filter processing.

7. An image processing method comprising:
performing filter processing using first to N-th division filters each having a plurality of filter coefficients on a first image to generate first to N-th intermediate images, where N is an integer of 2 or more;

combining the generated first to N-th division intermediate images to generate a second image; and changing a range to be subjected to the filter processing on the first image, for each of the division filters.

8. An imaging apparatus comprising:
an optical system including a lens;
a sensor configured to output an image signal by photoelectrically converting an object image formed by the optical system; and
at least one processor configured to perform image processing on the image signal output from the sensor, the at least one processor operating to:
perform filter processing using first to N-th division filters each having a plurality of filter coefficients on a first image to generate first to N-th intermediate images, where N is an integer of 2 or more; and
combine the generated first to N-th intermediate images to generate a second image,
wherein the at least one processor changes a range to be subjected to the filter processing on the first image, for each of the division filters.

9. The imaging apparatus according to claim 8, wherein the first to N-th division filters, when combined, form a cylindrical filter.

10. A storage medium storing a program for causing a computer to execute an image processing method, the method comprising:
performing filter processing using first to N-th division filters each having a plurality of filter coefficients on a first image to generate first to N-th intermediate images, where N is an integer of 2 or more;
combining the generated first to N-th division intermediate images to generate a second image; and
changing a range to be subjected to the filter processing on the first image, for each of the division filters.

* * * * *